US012578769B2

(12) United States Patent
Chung et al.

(10) Patent No.: US 12,578,769 B2
(45) Date of Patent: Mar. 17, 2026

(54) HOUSING STRUCTURE OF ELECTRONIC DEVICE

(71) Applicants: Elitegroup Computer Systems Co., Ltd., Taipei City (TW); Golden Elite Technology (SHENZHEN) LTD., Shenzhen City (CN)

(72) Inventors: Chi-Ming Chung, Taipei City (TW); Shih-Hao Chien, Taipei City (TW); Yi-Chun Lin, Taipei City (TW); Guan-Yu Chen, Taipei City (TW)

(73) Assignees: ELITEGROUP COMPUTER SYSTEMS CO., LTD., Taipei City (TW); GOLDEN ELITE TECHNOLOGY (SHENZHEN) LTD., Shenzhen City (CN)

( * ) Notice: Subject to any disclaimer, the term of this patent is extended or adjusted under 35 U.S.C. 154(b) by 118 days.

(21) Appl. No.: 18/805,571

(22) Filed: Aug. 15, 2024

(65) Prior Publication Data

US 2025/0284325 A1     Sep. 11, 2025

(30) Foreign Application Priority Data

Mar. 5, 2024     (TW) ................................. 113202216

(51) Int. Cl.
G06F 1/18 (2026.01)
(52) U.S. Cl.
CPC .................................... G06F 1/181 (2013.01)

(58) Field of Classification Search
CPC ...................................................... G06F 1/181
See application file for complete search history.

(56) References Cited

U.S. PATENT DOCUMENTS

| | | | | |
|---|---|---|---|---|
| 5,823,644 A * | 10/1998 | Suh | .......................... | G06F 1/181 |
| | | | | 292/124 |
| 6,158,105 A * | 12/2000 | Suh | ..................... | E05B 73/0082 |
| | | | | 361/725 |
| 8,297,720 B2 * | 10/2012 | Yang | ........................ | G06F 1/181 |
| | | | | 312/223.2 |
| 11,789,503 B1 * | 10/2023 | Chappell | .................. | G06F 1/181 |
| | | | | 361/679.02 |
| 2011/0193459 A1 * | 8/2011 | Yang | ..................... | E05C 19/022 |
| | | | | 312/326 |
| 2014/0113170 A1 * | 4/2014 | Wu | ...................... | H01M 50/262 |
| | | | | 429/100 |
| 2021/0132651 A1 * | 5/2021 | Hasse | ........................ | G06F 1/181 |
| 2023/0262909 A1 * | 8/2023 | Lee | .......................... | G06F 1/181 |
| | | | | 312/223.1 |
| 2024/0377877 A1 * | 11/2024 | Kasar | ................... | G02B 27/017 |

* cited by examiner

*Primary Examiner* — Michael Pervan
(74) *Attorney, Agent, or Firm* — WPAT, PC

(57) ABSTRACT

A housing structure of electronic device, which accommodates an electronic device. The housing structure of the electronic device includes a housing, a cover, a locking device and an elastic member. The housing includes a limit hook, and the locking device includes a push button and a push rod. By pushing the push button and driving the push rod to slide, the push rod drives the hook that contained in it to leave the limit hook and the elastic member elastically pushes the electronic device to rotate the cover upward, thereby solving the inconvenience of the conventional shell structure that requires the use of tools to disassemble.

11 Claims, 8 Drawing Sheets

HOUSING STRUCTURE OF ELECTRONIC DEVICE

FIELD OF THE INVENTION

The present application relates to a housing structure, and particularly to a housing structure of electronic device.

BACKGROUND OF THE INVENTION

A computer is a device that executes calculations and operations according to instructions. It was invented in industry and gradually expanded to be used for leisure, creation, and other purposes. Desktop computers and notebook computers are the common types. Desktop computers have larger volumes. However, their inner spaces can be equipped with higher-standard accessories inside. Notebook computers are relatively more thin and more light, and can be carried everywhere. Unfortunately, their components, such as graphics cards, may not be as good as components of desktop computers, nor can they be equipped with cooling equipment as better as cooling components of desktop computers. Nonetheless, notebook computers are more convenient for students or office workers who do not need to pursue the highest component specifications but need to carry their computers with ease.

Computers were originally invented for scientific needs. Alan Turing invented the Turing machine. The following year, his graduate student Claude Shannon published a paper, which is mentioned execution of mathematical operations and other functions using switches, and related electronic circuits were subsequently published. Until 1941, a computer with automatic binary mathematical calculations and program execution was completed, followed by the Atanasoff-Berry computer that performed binary operations and used memory, and later the Colossus computer and the Harvard Model I. The Cyclone computer was produced in conjunction with the training of pilots during World War II. Later, a development team improved the computer's drawbacks in storage to complete the program storage architecture, which is the basis of today's computers. Afterwards, by development with the invention of integrated circuits, microprocessors and so on, computer equipment is further strengthened. it makes huge computers be developed toward smaller computers with faster computing speed and more reliability. It has gradually moved from purely scientific computing equipment to being sold as a commodity. It began to be used in homes around the 1970s. In the 1980s, microcomputers became popular and entered schools and homes in massive. Then Microsoft invented the first generation MPC and paired it with a CD player.

The computers that first entered homes and schools were called desktop computers. They generally included a screen, a motherboard, a central processing unit, a graphics card, a sound card, a power supply, a CD player, a hard drive, and a keyboard. Later, the invention of notebook computers gradually replaced part of desktop computers at homes or at work due to the convenience of being portable. Others who have stricter requirements for computer accessories continue to use desktop computers and continued to pursue better computer performance. After development of desktop computers, minicomputers with smaller size were developed.

A minicomputer is also a desktop computer, and its size is similar to a modem. Compared with a general desktop computer, it occupies less space. Its motherboard is generally equipped with processors, display chips, and memory, operated in low power consumption. The operating system can include MacOS, windows, Google, and some self-installable software.

Compared with desktop computers, minicomputers have the disadvantage of poorer heat dissipation, and when the internal hardware needs upgrading, there are fewer replacement options. However, apart from the above disadvantages, The gap between the performance of its internal components, such as processors, and the common components in desktop computers is gradually decreasing. Thereby, some consumers are gradually replacing their large desktop computers with minicomputers.

However, although minicomputers are more inconvenient for hardware upgrades and heat dissipation than larger desktop computers, users will still disassemble the housing of minicomputers when performing necessary upgrades or cleaning the internal fan. When disassembling at home, there are usually disassembling tools for minicomputers at home such as screwdrivers. Unfortunately, most users do not carry these tools with them outside, or the tools at home do not meet the specifications, so they cannot disassemble the housing of the minicomputer to replace internal hardware or clean the internal fan, bringing considerable inconvenience to users who need to replace the hardware in a timely manner. Accordingly, a housing that can be disassembled without tools is needed.

To solve the above problem, the present invention provides a housing structure of electronic device, which comprises a housing, a cover, a locking device, and an elastic member. While the push button of the locking device drives the hook of the push rod of the locking device to leave the limit hook of the housing, the elastic member pushes the electronic device by elasticity to make the cover to rotate upward. Thereby, it is convenient to disassemble the housing of the electronic device without using any tool.

SUMMARY OF THE INVENTION

An objective of the present invention is to provide a housing for accommodating an electronic device. When a cover locks a housing, by pushing a push button of a locking device disposed below the cover, the push button will push a push rod of the locking device. The push rod drives a hook disposed at the extension of the push rod to leave a limit hook of the housing. Meanwhile, the elastic member located below the cover pushes the electronic device by elasticity and making the cover to rotate upward. Thereby, the inconvenience of requiring tools to disassemble the housing structure according to the prior art can be solved.

To achieve the above objective, the present invention provides a housing structure of electronic device, which accommodates an electronic device. The housing structure of electronic device comprises a housing, a cover, a locking device, and an elastic member. The housing accommodates the electronic device at an inner side thereof and includes an opening and a first sidewall. The first sidewall includes a limit groove adjacent to the opening. The first sidewall includes a limit protruding part disposed toward the inner side of the housing adjacent to the opening. A second sidewall is disposed opposing to the first sidewall of the housing. A limit hook is disposed adjacent to the opening. A buckle member and a rotating buckle are disposed extending from one side of the cover. The buckle member hooks the limit groove correspondingly. The rotating buckle buckles the limit protruding part correspondingly. The locking device is disposed below the other side of the cover. The locking device includes a push button and a push rod. The push button passes through and projecting the bottom of the cover. One end of the push rod is connected to a protruding end of the push button. A hook is disposed extending from the other end of the push rod. The hook buckles the limit hook. The elastic member is disposed below the side of the cover. The elastic member is disposed between the locking device and the rotating buckle. The elastic member is disposed against the top of the electronic device. When pushing the push button drives the push rod to slide, the push rod drives the hook to leave the limit hook. In the meanwhile, the elastic member pushes the electronic device by elasticity to rotate the cover upward.

According to an embodiment of the present invention, the first sidewall and the second sidewall of the housing include a plurality of holes, respectively.

According to an embodiment of the present invention, a third sidewall of the housing includes a port hole and is disposed between the first sidewall and the second sidewall.

According to an embodiment of the present invention, the cover is passed through by a locking member, which includes a rotating part and a locking part. The rotating part is disposed on the top of the cover. The locking part is disposed below the rotating part. The locking part is disposed against the end of the push rod.

According to an embodiment of the present invention, the cover includes a plurality of socles on the top.

According to an embodiment of the present invention, the elastic member is disposed on one side and adjacent to the rotating buckle.

According to an embodiment of the present invention, the elastic member is a rubber.

According to an embodiment of the present invention, a first height of the elastic member plus a second height of the electronic device is greater than an internal depth of the housing.

According to an embodiment of the present invention, a sloped surface is disposed below the elastic member and facing the rotating buckle.

According to an embodiment of the present invention, the elastic member includes a plurality of cutting grooves.

According to an embodiment of the present invention, when the cover rotates, the buckle member rotates in the limit groove and the rotating buckle rotates at the limit protruding part.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In view of the fact that previous housings of electronic devices such as minicomputers used screws to lock the housing and the outer cover, removing the outer cover and subsequently locking the outer cover and the housing require the use of tools such as screwdrivers. Unfortunately, most people do not move around with a screwdriver, so when some people need to use a screwdriver to remove the outer cover immediately, they fall into an unsolvable situation. Accordingly, the present invention provides a housing for accommodating an electronic device. By pushing a push button of a locking device disposed below the cover, the push button will push a push rod of the locking device. The push rod drives a hook disposed at the extension of the push rod to leave a limit hook of the housing. Meanwhile, the elastic member located below the cover pushes the electronic device by elasticity and making the cover to rotate upward. Thereby, the inconvenience of requiring tools to disassemble the housing structure according to the prior art can be solved.

In the following, the characteristics and the accompanying structure of the present invention will be further illustrated.

Figure 1:
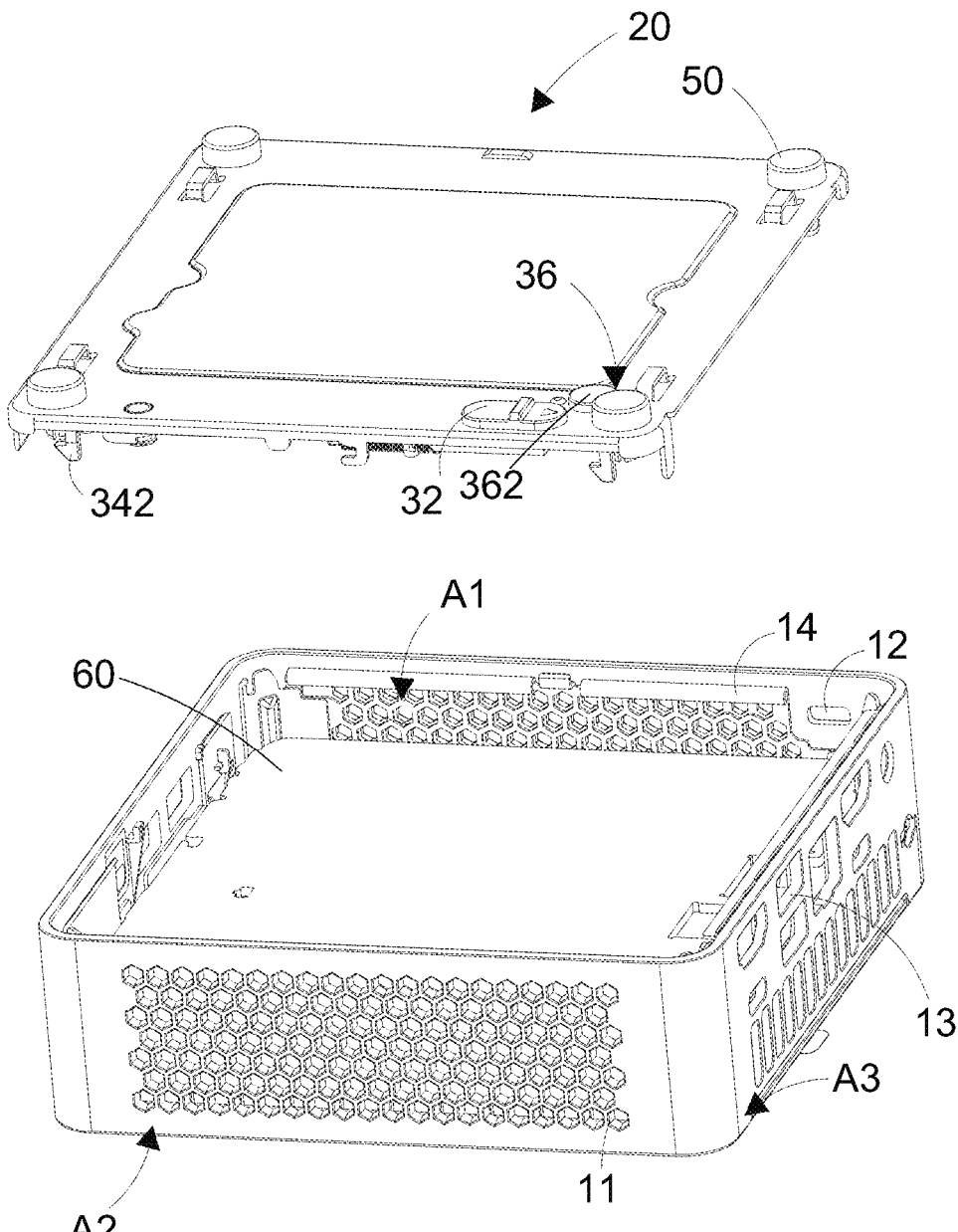
FIG. 1 shows a stereoscopic view according to an embodiment of the present invention.
Figure 2:
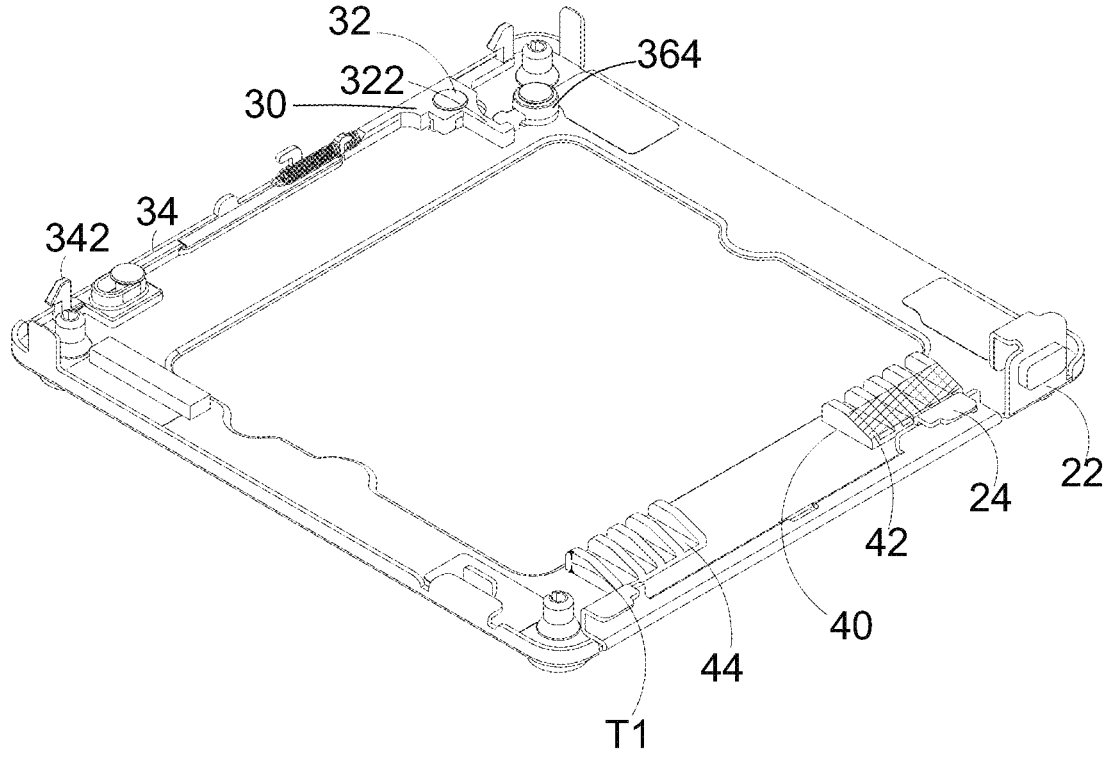
FIG. 2 shows a schematic diagram below the cover according to an embodiment of the present invention.
Figure 3:
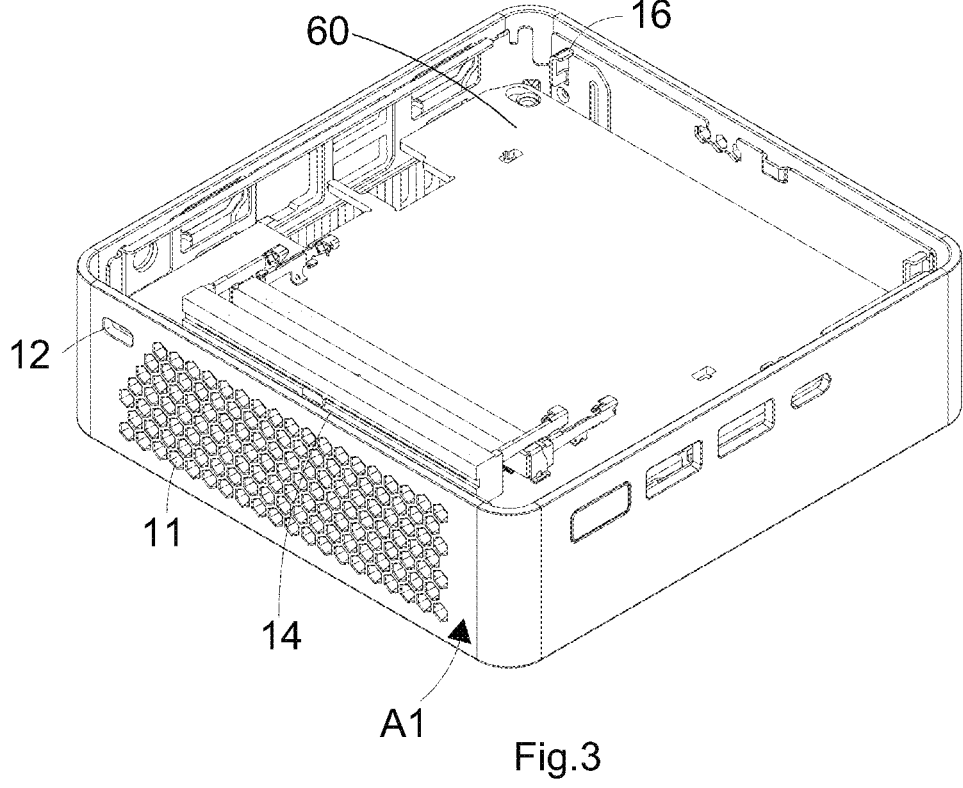
FIG. 3 shows a stereoscopic view of another angle of the housing according to an embodiment of the present invention.
Figure 4:
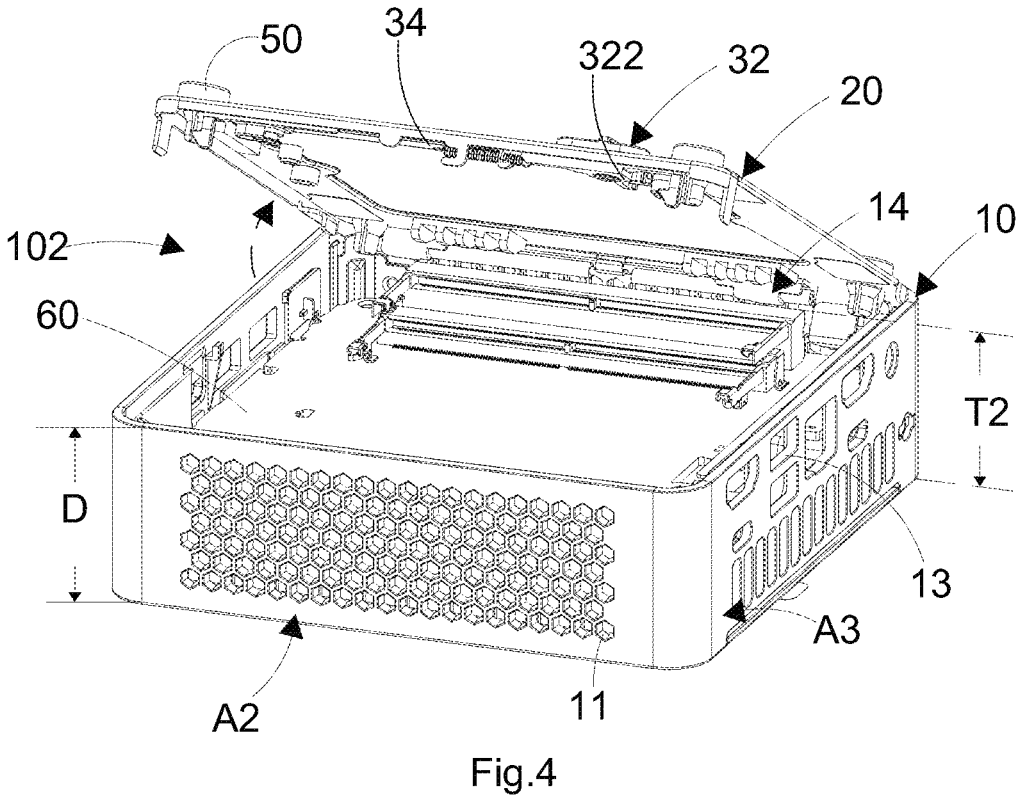
FIG. 4 shows a schematic diagram of the lifted cover according to an embodiment of the present invention.

First, please refer to FIG. 1, FIG. 3, and FIG. 4, which show a stereoscopic view, a stereoscopic view of another angle of the housing, and a schematic diagram of the lifted cover according to an embodiment of the present invention. In FIG. 3, some components are placed on the substrate of an electronic device 60 for illustration. The housing structure of electronic device capable of accommodating the electronic device 60 comprises a housing 10, a cover 20, a locking device 30, and an elastic member 40.

The electronic device 60 is disposed at an inner side of the housing 10. The housing 10 includes an opening 102. The housing 10 includes a first sidewall A1. A limit groove 12 passes through the first sidewall A1 adjacent to the opening 102. A limit protruding part 14 is disposed on the first sidewall A1 toward the inner side of the housing 102 and adjacent to the opening 102. The number and shape of the limit protruding part 14 can be changed according to requirements and are not limit to the example shown in FIG.

1. A second sidewall A2 is disposed opposing to the first sidewall A1 of the housing 10. The second sidewall A2 is disposed opposite to the first sidewall A1. A limit hook 16 is disposed on the second sidewall A2 adjacent to the opening 102.

Figure 5:
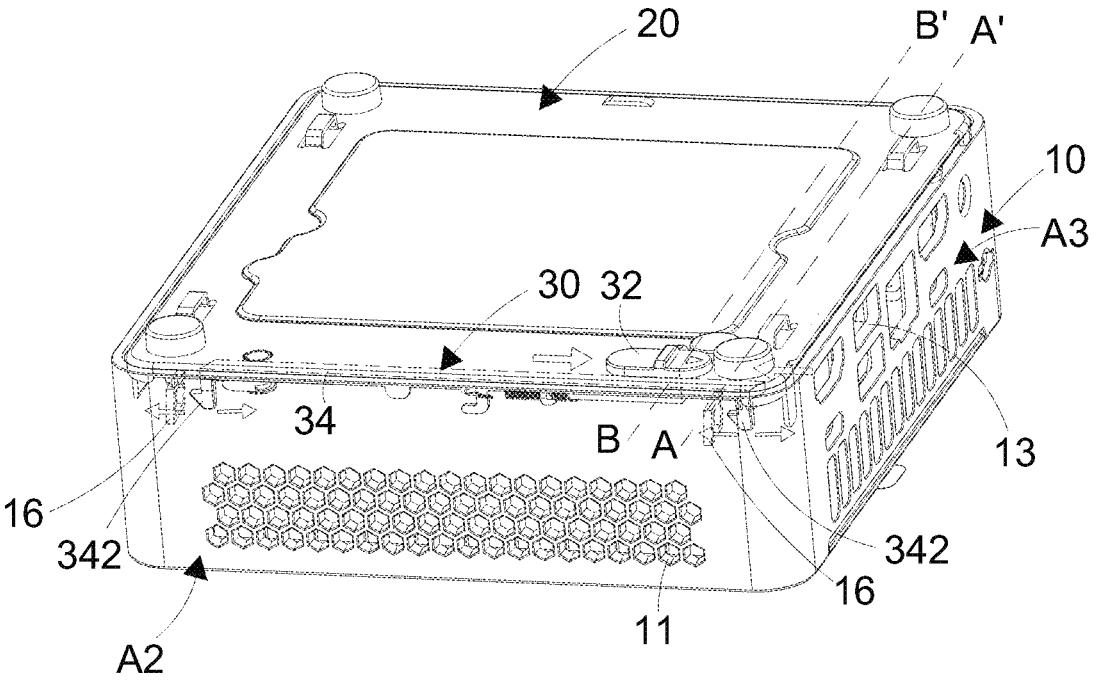
FIG. 5 shows a schematic diagram of the operation of the locking device according to an embodiment of the present invention.
Figure 6:
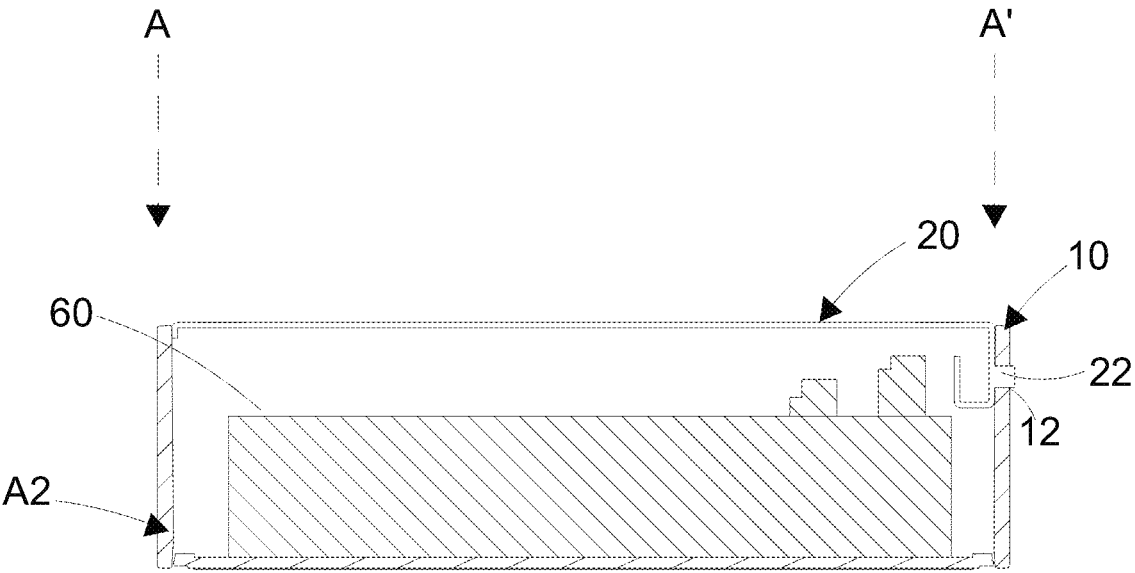
FIG. 6 shows a cross-sectional view along the cutline A-A' in FIG. 5 according to the present invention.
Figure 7A:
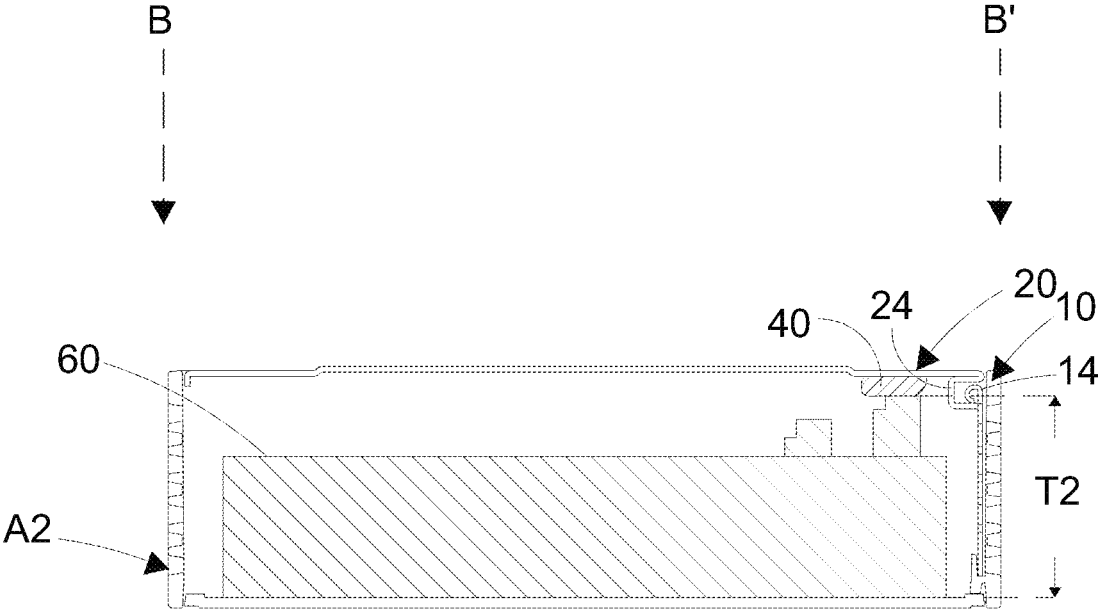
FIG. 7A shows a first cross-sectional view along the cutline B-B' in FIG. 5 according to the present invention.
Figure 7B:
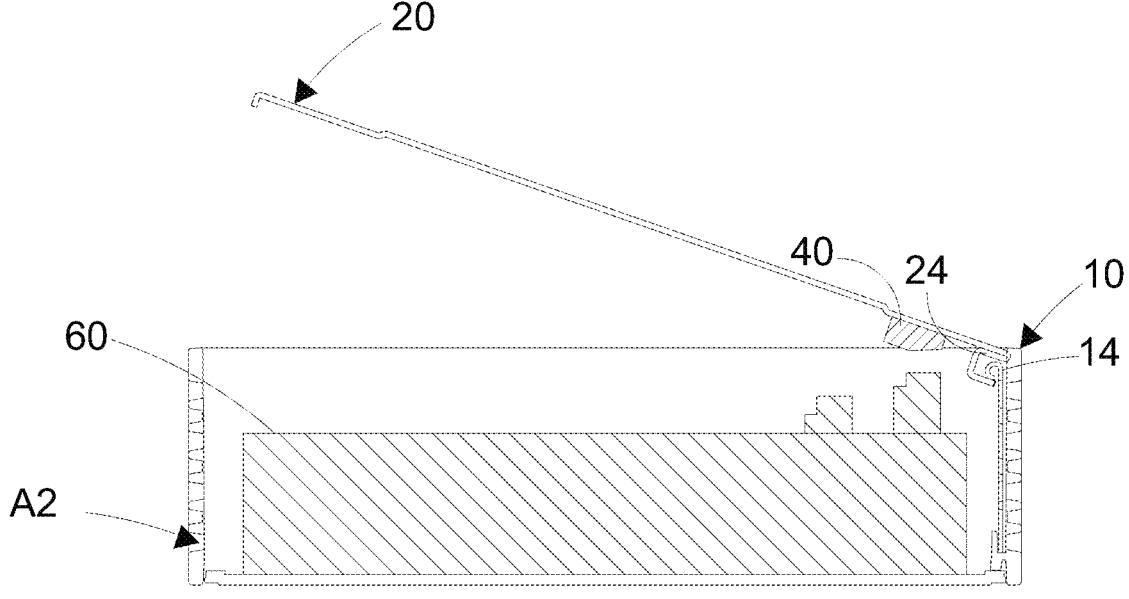
FIG. 7B shows a second cross-sectional view along the cutline B-B' in FIG. 5 according to the present invention.

Please refer to FIG. 1, FIG. 3, and FIG. 4 again, and to FIG. 2, FIG. 5, FIG. 6, FIG. 7A, and FIG. 7B, which show a schematic diagram below the cover, a schematic diagram of the operation of the locking device, a cross-sectional view along the cutline A-A' in FIG. 5, a first cross-sectional view along the cutline B-B' in FIG. 5, and a second cross-sectional view along the cutline B-B' in FIG. 5 according to the present invention. A buckle member 22 and a rotating buckle 24 are disposed extending from one side of the cover 20. One side of the cover 20 corresponds to the first sidewall A1. The buckle member 22 corresponds to the limit groove 12. When the cover 20 covers and buckles the housing 10, the buckle member 22 buckles the limit groove 12 correspondingly for avoiding coming off when the cover 20 faces downward. The rotating buckle 24 buckles the limit protruding part 12 correspondingly to enable the cover 20 upwardly rotatable about the limit protruding part 14. The locking device 30 is disposed on the other side of the cover 20. The other side of the cover 20 corresponds to the second sidewall A2 of the housing 10. The locking device 30 includes a push button 32 and a push rod 34. The push button 32 passes through the bottom of the cover 20. One end of the push rod 34 is connected to a protruding end 322. A hook 342 is disposed on the other end of the push rod 34. When the cover 20 covers and buckles the housing 10, the hook 342 buckles the limit hook 16. The elastic member 40 is further disposed below the one side of the cover 20 and disposed between the locking device 30 and the rotating buckle 24. The elastic member 40 is disposed against the top of the electronic device 60. A first height T1 of the elastic member 40 plus a second height T2 (including the height from the substrate to the bottom of the housing 10 and the components on the substrate shown in FIG. 3) of the electronic device 60 must be greater than an internal depth D of the housing 10. Thereby, when the cover 20 covers and buckles the housing 10, the electronic device 60 will squeeze the elastic member 40 correspondingly. Then the electronic device 60 can apply force to the elastic member 40 continuously.

To open the cover 20, push the push button 32 for driving the push rod 34 to slide. The push rod 34 drives the hook 342 to leave the limit hook 16. Meanwhile, the elastic member 40 of the unlocked cover 20 pushes the electronic device 60 by elasticity and rotates the cover 20 upward.

Please refer to FIG. 4 as well as FIG. 5, FIG. 6, FIG. 7A, and FIG. 7B. FIG. 4 shows a schematic diagram of the lifted cover according to an embodiment of the present invention. According to the cross-sections along the cutlines A-A' and B-B' in FIG. 5, the buckle member 22 of the cover 20 rotates in the limit groove 12 and the rotating buckle 24 rotates about the limit protruding part 14, making the cover 20 to be opened with ease.

According to an embodiment, a locking member 36 further passes through the cover 20. The locking member 36 includes a rotating part 362 and a locking part 360. The rotating part 362 is disposed on the cover 20. The locking part 364 is disposed below the rotating part 362 and located below the cover 20. The locking park 364 is disposed against one end of the push rod 34.

According to an embodiment, the first sidewall A1 and the second sidewall A2 of the housing 10 include a plurality of holes 11 for air circulation and thus achieving the effect of heat dissipation.

According to an embodiment, a third sidewall A3 is disposed between the first sidewall A1 and the second sidewall A2 and includes port holes 13.

According to an embodiment, a plurality of socles 50 are disposed below the cover 50. When the cover 20 covers the housing 10 and both are placed on a plane, the plurality of socles 50 supports the cover 20 and the housing 10.

According to an embodiment, the elastic member 40 is an elastic component such as, but not limited to, a rubber material.

According to an embodiment, the elastic member 40 is disposed between the locking device 30 and the rotating buckle 24 and adjacent to one side of the rotating buckle 24.

According to an embodiment, the elastic member 40 further includes a plurality of cutting grooves 44. The cutting grooves 44 can soften the elastic member 40 for avoiding inability of the cover 10 in covering the housing 20 owing to excessively hardness of the elastic member 40.

According to an embodiment, a sloped surface 42 is disposed below the elastic member 40 and facing the rotating buckle 24. Compared to not including the sloped surface 42, the slope surface 42 of the elastic member 40 further facilitates upward bounce of the cover 20.

To sum up, the present invention provides a housing structure of electronic device 60. The limit groove 12 located on the housing 10 and the buckle member 22 located on the cover 20 buckle. The limit protruding part 14 on the housing 10 and the rotating buckle 24 located on the cover 20 buckle. The limit hook 16 located on the housing 10 and the hook 342 located on cover 20 buckle. Besides, the elastic member 40 located on the cover 20 is disposed against the electronic device 60 to buckle the cover 20 on the housing 10. While disassembling the cover 20, the push button 32 pushes the push rod 34. The push rod 34 drives the hook 342 to leave the limit hook 16. Meanwhile, the elastic member 40 pushes the electronic device 60 by elasticity to rotate the cover upward. No matter buckling the cover 20 and the housing 10 or removing the cover 20, no tool is required for assistance. Thereby, the convenience of disassembling or buckling the cover 20 will be further improved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A housing structure of electronic device, accommodating an electronic device, and comprising:
  a housing, accommodating the electronic device at an inner side thereof and including an opening, a first sidewall and a second sidewall, a limit groove passing through the first sidewall and adjacent to the opening, a limit protruding part disposed on the first sidewall, toward the inner side of the housing and adjacent to the opening, the second sidewall disposed at an opposing side of the first sidewall, and a limit hook disposed on the second sidewall and adjacent to the opening;
  a cover, including a buckle member and a rotating buckle disposed extending from one side of the cover, the buckle member buckling the limit groove correspondingly, and the rotating buckle buckling the limit protruding part correspondingly;

a locking device, disposed below another side of the cover, including a push button and a push rod, the push button passing through and protruding on the bottom of the cover, an end of the push rod connected to a protruding end of the push button, a hook disposed extending from the other end of the push rod, and the hook buckling the limit hook; and an elastic member, disposed below the side of the cover, disposed between the locking device and the rotating buckle, and disposed against a top of the electronic device;

wherein when pushing the push button drives the push rod to slide, the push rod drives the hook to leave the limit hook, in the meanwhile, the elastic member pushes the electronic device by elasticity to rotate the cover upward.

2. The housing structure of electronic device of claim 1, wherein the first sidewall and the second sidewall of the housing include a plurality of holes, respectively.

3. The housing structure of electronic device of claim 2, wherein the housing further includes a third sidewall, which includes a port hole and is disposed between the first sidewall and the second sidewall.

4. The housing structure of electronic device of claim 1, wherein the cover is passed through by a locking member, which includes a rotating part and a locking part; the rotating part is disposed on the top of the cover; the locking part is disposed below the rotating part; and the locking part is disposed against the end of the push rod.

5. The housing structure of electronic device of claim 1, wherein the cover includes a plurality of socles on the top thereof.

6. The housing structure of electronic device of claim 1, wherein the elastic member is disposed on one side of and adjacent to the rotating buckle.

7. The housing structure of electronic device of claim 1, wherein the elastic member is a rubber.

8. The housing structure of electronic device of claim 1, wherein a first height of the elastic member plus a second height of the electronic device is greater than an internal depth of the housing.

9. The housing structure of electronic device of claim 1, wherein a sloped surface is disposed below the elastic member and facing the rotating buckle.

10. The housing structure of electronic device of claim 1, wherein the elastic member includes a plurality of cutting grooves.

11. The housing structure of electronic device of claim 1, wherein when the cover rotates, the buckle member rotates in the limit groove and the rotating buckle rotates at the limit protruding part.

* * * * *